United States Patent [19]
Wolff

[11] 4,246,603
[45] Jan. 20, 1981

[54] WIDE ANGLE TELEVISION DISPLAY SYSTEM

[76] Inventor: Hanns H. Wolff, 8624 Caracas Ave., Orlando, Fla. 32817

[21] Appl. No.: 699,042

[22] Filed: Jun. 23, 1976

[51] Int. Cl.³ .............................................. H04N 5/68
[52] U.S. Cl. ...................................................... 358/87
[58] Field of Search .................. 358/87, 88, 225, 231, 358/237, 238; 315/370, 378

[56] References Cited
U.S. PATENT DOCUMENTS

| | | | |
|---|---|---|---|
| 2,971,054 | 2/1961 | Holt, Jr. | 358/87 |
| 3,505,465 | 4/1970 | Rees | 358/87 |
| 3,692,934 | 9/1972 | Herndon | 358/87 |
| 3,740,469 | 6/1973 | Herndon | 358/87 |
| 3,757,040 | 9/1973 | Bennett et al. | 358/87 |
| 3,758,714 | 9/1973 | Herndon | 358/87 |

Primary Examiner—Robert L. Richardson

[57] ABSTRACT

A wide angle television display system consisting of a plane annular input - circular (preferably spherical) output optical system, a cathode ray tube or similar device for generating the display and a deflection signal (voltage or current) generator which causes the displayed light spot which forms the scanning lines of the display to progress at a constant spherical-angular speed.

21 Claims, 15 Drawing Figures

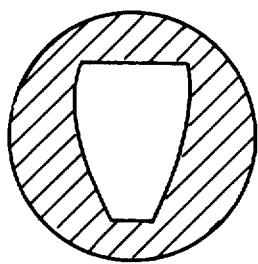
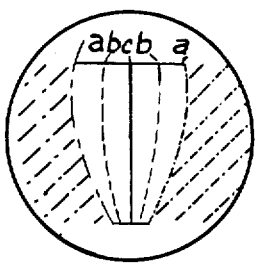
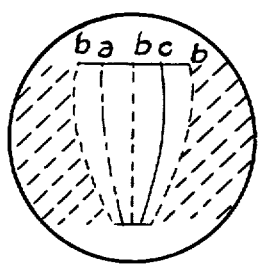
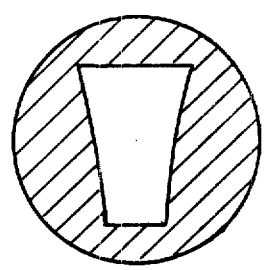
FIG. 5    FIG. 6    FIG. 7    FIG. 8
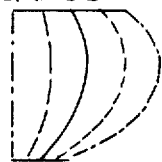
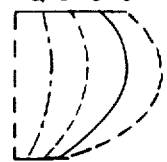
FIG. 12    FIG. 13
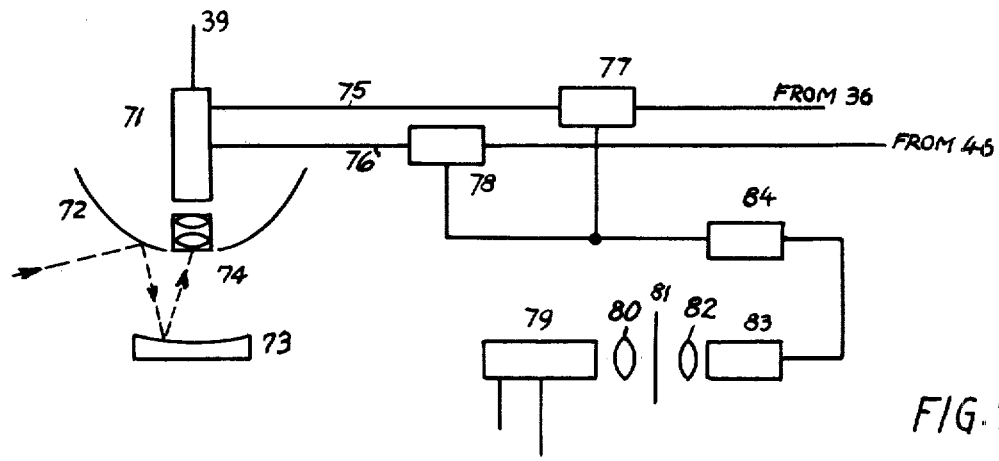
FIG. 9
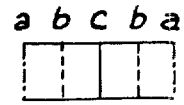
FIG. 14
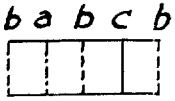
FIG. 15
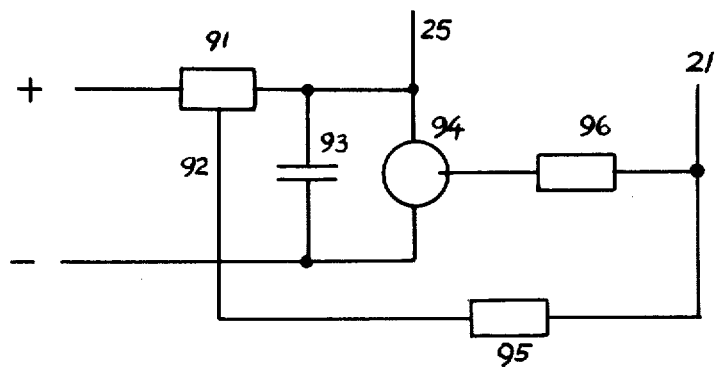
FIG. 10

WIDE ANGLE TELEVISION DISPLAY SYSTEM

BACKGROUND OF THE INVENTION

For the simulation of the visual environment and other display purposes a picture generation system is often needed that is able to provide a wide angle azimuthal and elevation display. In many cases, for example if a nonprogrammed display is required, such as in training devices, an optical movie projection system is not satisfactory and television means have to be used for the generation of a "real time" display picture.

For the generation of wide angle pictures of this type multichannel systems have been used in which each television channel provides the generation of a narrow angle picture both in azimuth (for example 60°) and in elevation (for example 45°) and in which the wide angle display (for example 180° in azimuth and 90° in elevation angle span) consists of an assembly of several such narrow angle television picture display systems. Such systems unfortunately show always the joints between neighbouring channels which results in a very disturbing total picture and shows in case of color systems disturbing color mismatches.

SUMMARY OF THE INVENTION

Optical systems are known which are able to project a plane picture onto a wide angle circularly arranged, for example cylindrical or spherical screen. The plane picture required to provide a cylindrical or spherical display of scenes by such optical systems is of an annularly distorted shape of the scenes to be displayed.

This invention consists in such a plane annular input-circular, for example cylindrical or spherical, output optical system in combination with a television display system which is producing a constant spherical-angular speed scan at the display at least for several display lines forming the display.

Another feature of this invention consists in that the optical system has a spherical output.

Another feature of this invention consists in that at least those scanning lines—and in case of more than one channel within each channel—which fall between an elevation angle of 45° and the maximum elevation angle and/or those which fall between a depression angle of 45° and the maximum depression angle are scanned with a constant spherical-angular display speed.

Another feature of this invention consists in that—and in case of more than one channel within each channel—at least 60% of the display area is scanned with a constant scanning time per steradian.

Another feature of this invention consists in—and in case of more than one channel within each channel—those display areas which display significant information are scanned with a constant spherical-angular speed scan at the display.

Another feature of the invention consists in that the picture forming display lines are are either circles or spirals.

Another feature of this invention consists in that the plane annular display to be projected is generated by a television display system (cathode ray tube or similar device) which uses sinusoidal line deflection signals (voltages or currents) of frequencies whose periods are proportionate to the cosine of the angle between the horizon line and the momentary display line.

Another feature of this invention consists in that the amplitude of the sinusoidal deflection signal (voltage or current) changes—and in case of more than one channel within each channel—from line to line such that successive display circles or spirals are progressing by a constant elevation spherical-angular amount within the constant angular speed scanning display area.

Another feature of the invention consists in that—and in case of more than one channel within each channel—the elevation and depression angular display distance of consecutive lines is constant over the whole display area.

Another feature of this invention consists in that the line deflection signal generator—and in case of more than one channel the line deflection signal generator of each channel—provides single sine and cosine periods or parts thereof of frequencies which are proportionate to the secant of the angle between the line to be displayed and the horizon line or the channel displacement of the horizon line.

Another feature of this invention consists in that the elevation respectively the depression angle of display points of the plane annular input-circular output optical system is linearly proportionate to the radius of the corresponding source points of the plane annular input.

Another feature of this invention consists in a signal generator which produces line scanning time signals of varying lengths.

Another feature of this invention consists in a line-scanning time signal generator which comprises a flying spot scanner, a line scanning time defining diaphragm and a photocell.

Another feature of this invention consists in a rotary signal generator, for example a magnetic drum or disk, which provides line scanning starting and line scanning ending signals.

Another feature of this invention consists in a converter that converts the line scanning time signals to sine and cosine wave signals or parts thereof.

Another feature of this invention consists in that the line scanning time to sine and cosine wave converter encompasses a sine and a cosine or parts thereof gray scale diaphragm.

Another feature of this invention consists in that the rotary signal generator provides amplitude control signals for the display deflection signal generator.

Another feature of this invention consists in that the rotary signal generator generates directly the sine and cosine waves or parts thereof.

Another feature of this invention consists in that the rotary signal generator is equipped with a multiple signal pick-up system, one for each channel for multichannel operation.

BRIEF DESCRIPTION OF THE DRAWINGS

FIG. 5 shows a diaphragm for the line scanning time signal generator.

FIG. 6 shows a cosine gray scale diaphragm.

FIG. 7 shows a sine gray scale diaphragm.

FIG. 8 shows an amplitude control diaphragm.

FIG. 9 shows a video signal generation system for a display system as shown in FIG. 4.

FIG. 10 shows circuitry for a spiral type scan.

FIG. 12 shows a modification of the FIG. 6 layout of a cosine gray scale diaphragm.

FIG. 13 shows a modification of the FIG. 7 layout of a sine gray scale diaphragm.

FIG. 14 shows a cosine gray scale diaphragm for constant amplitude scanning.

FIG. 15 shows a sine gray scale diaphragm for constant amplitude scanning.

DESCRIPTION OF THE PREFERRED EMBODIMENTS

The problem the invention solves will be explained in detail on hand of FIGS. 1 and 2.

Figure 1:
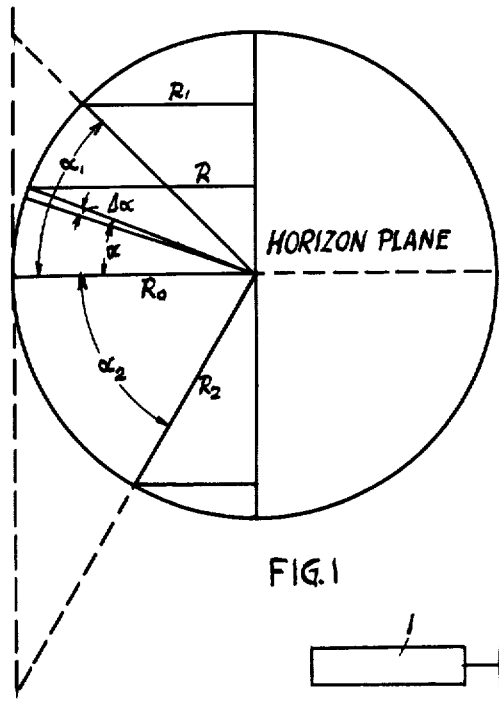
FIG. 1 shows a vertical crosscut thru the display sphere. Also shown in dotted line is part of an equivalent cylindrical screen.

FIG. 1 shows a spherical screen of radius $R_o$, in the center of which an optical system is arranged that projects onto the screen a wide angle (in azimuth and elevation) display. The screen area covered by this display lies between a maximum elevation angle $\alpha_1$ and a maximum depression angle $\alpha_2$, that is the area covered in elevation stretches over an elevation range of angle $\alpha_1 + \alpha_2$.

Figure 2:
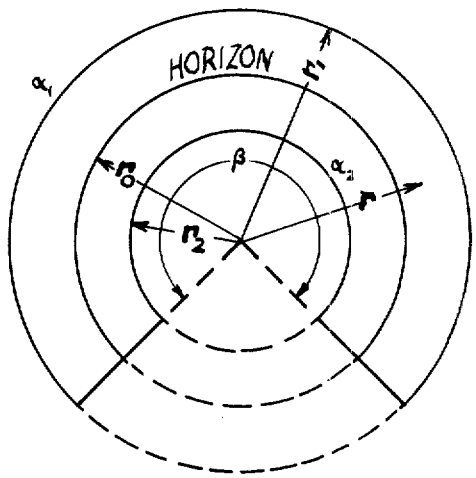
FIG. 2 shows the plane annular input needed for the kind of optical system used in the invention.

The input picture to the optical system is of plane annular shape as shown in FIG. 2, which shows the outer (maximum elevation) border line $\alpha_1$ of radius $r_1$ and the inner (maximum depression) border line $\alpha_2$ of radius $r_2$. It should be noted that, if the optical system is arranged upside down, the elevation angle lines of the annular input fall inside and the depression angle lines fall outside the horizon line of radius $r_0$.

The azimuthal coverage of the display may be limited to an azimuth angle range of $\beta$ (see FIG. 2).

The display on the screen is formed by a light spot that is travelling in circular (or spiral) lines over the screen. These lines are spaced at constant elevation angular distances $\Delta\alpha$ such that an even display over the whole display area is achieved.

The radius of the display line representing the horizon is $R_0$, that of the maximum elevation angle $\alpha_1$ is $R_1$, that of the maximum depression angle $\alpha_2$ (the extreme negative elevation) is $R_2$ and generally that of a line at angle $\alpha$ is $R$.

The light spot forming the display lines has to travel over the screen at a constant spherical-angular speed to achieve an undistorted and smooth picture and consequently since the line lengths vary from line to line the time (period) required to form the display lines is varying from line to line. For example the maximum elevation line of radius $R_1$ requires a display time that equals that of the horizon line times cos $\alpha_1$. Generally a line at elevation angle $\alpha$ and radius R requires a display time which equals cos $\alpha$ times the horizon line display time.

The plane annular picture shown in FIG. 2 which is projected by the optical system onto the screen has to be generated by a light spot which is scanning over the area between $\alpha_1$ and $\alpha_2$ in circular (or spiral) fashion at speeds commensurate to the required display scanning times.

The plane annular input picture may be generated by a cathode ray tube or similar cathode ray controlled light output (for example schlieren optic) device.

These devices—equipped with a rectangular deflection system (electrostatic or electromagnetic or mixed electrostatic-electromagnetic)—allow to produce circular displays by a sine and a cosine wave (voltage or current) of the same frequency which are 90° out of phase. For the purposes of this invention this frequency has to change from line to line and has to be equal to the frequency used for the display of the horizon line times the secant of the angle $\alpha$ between the horizon line and the momentary display line. If, for example, the maximum elevation angle $\alpha_1$ and the maximum depression angle $\alpha_2$ are equal, the light spot generating the annular input to the optical system has to be moved with the same frequency to generate the circular line of radius $r_1$ and that of radius $r_2$.

As it will be explained later the display may be generated by the superposition of two or more channel inputs which are generated such that the circles (or spirals) of the second and further channels forming the input to the optical system are falling between consecutive circles (or spirals) of the first channel to form an interlaced display picture. The same set of scanning frequencies may be used, that is the scanning frequencies of the additional channels are proportionate to the secant of the angle between the line being displayed and that closest channel line which is next to the exact horizon line.

Whereas for a 360° azimuthal display full sine and cosine cycles are required, a display limited to azimuth angle $\beta$ requires only a corresponding part of a full cycle, namely $\beta/2\pi$ cycles of the sine/cosine wave signals.

FIG. 1 shows also in dashed line a part of an equivalent cylindrical screen and the display area on the screen between $\alpha_1$ and $\alpha_2$.

For the generation of the video input to the cathode ray device an annular picture similar to the one shown in FIG. 2 can be generated by an optical system corresponding to the one used for the projection in the sphere, using of course the light path in reverse. The picture thus generated can then be scanned by a vidicon or similar television camera in the same circular (or spiral) fashion using the same scanning signals that are used for the display. The visual input to this optical system may be a model board or a natural scene. In lieu of an optically generated input for the video of the display system a computer generated picture may be used. Since the amplitude of the sine/cosine wave deflection signals determines the radius of the circle which the cathode ray device displays and a linear progression from scanning line to scanning line of the annular input is desirable the optical projection system is preferably designed such that the radial transfer function is $\alpha = c(r - r_0)$, where c is a constant. That is a linear relationship between the elevation angle $\alpha$ of a display point on the sphere and the radius r of the corresponding source point in the optical input is desirable. If the optical display system lacks this linearity feature a non-linear amplitude control of the sine/cosine wave signals has to be provided.

The system for the generation of the sinusoidal deflection signals (voltages and/or currents) for the line scanning may consist of two subsystems, one that determines the scanning time (that is the length) of the display line or period of the frequency to be generated for scanning the line and one that converts the scanning time signals into a sine and a cosine wave cycle or part of a cycle.

Figure 3:
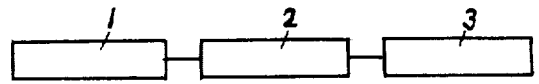
FIG. 3 shows a functional block diagram of some embodiments of the invention.

FIG. 3 shows the overall display system in a functional blockdiagram form. 1 designates a generator that produces consecutively scanning time signals $T = k \cos$ α for each of the scanning lines, k being a constant. These scanning time signals are converted in a converter 2 into corresponding single cycle frequencies (or parts of them if less than 360° has to be displayed in azimuth). Converter 2 releases 90° out of phase sine and cosine voltage (or current) cycles which are fed after being controlled in amplitude (to place the scanning circle (or spiral) at the appropriate radius r of the annular input, see FIG. 2) to the deflection system of the display system 3.

Figure 4:
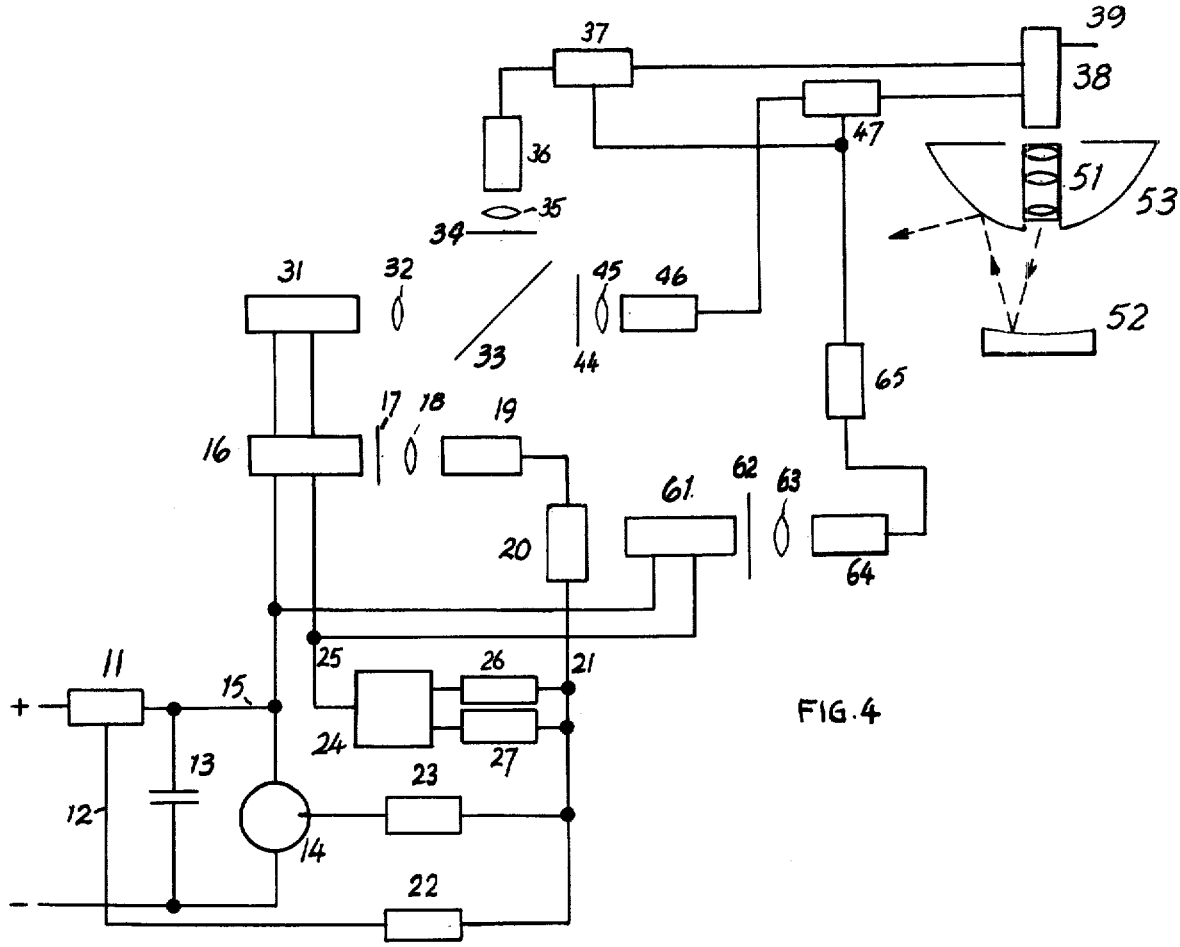
FIG. 4 shows an embodiment of the display system.

FIG. 4 shows a circuit diagram of a display system according to this invention. A constant current device 11 is set or controlled via line 12. Thru this device a capacitor 13 is charged preferably linearly until it is discharged thru device 14 (for example a thyratron). The sawtooth voltage thus generated is fed to the horizontal deflection plates of a cathode ray tube 16, whose light spot falls onto a diaphragm 17 (described later). The light spot, if passing diaphragm 17, falls via a collector lens onto photocell 19. The photocell output feeds an amplifier 20 which releases on-off signals on line 21, which correspond to the light spot of cathode ray tube 16 being passed or being blocked by diaphragm 17.

The diaphragm 17 may be designed as shown in FIG. 5. The contour (cut-out) of this diaphragm corresponds to the T = k cos α requirement, the upper cutout border line, for example, corresponding to T = k cos $α_1$, the lower one corresponding to T = k cos $α_2$.

A control system 22 can be provided, if a three level operation, ultra fast charge for line to line separation, medium fast charge as a preparation for the slow cutout movement and the slow charge for the cutout area is desired. In a two level (on-off) operation line 21 may control line 12 of device 11 directly.

When the on-off signal generated on line 21 turns to off, a pulse is derived thru filter 23, which initiates the discharge operation of device 14 and thereby resets the line scanning system 11,13,14.

A staircase generator 24 feeds via line 25 the vertical deflection plates of cathode ray tube 16. Filter 26 derives at the end of a scanning line a pulse from line 21 to generate the next step of the staircase generator 24. When the cathode ray beam of cathode ray tube 16 has been moved by the staircase generator 24 beyond the bottom line of the diaphragm 17 cutout a long pulse is derived from line 21 which thru filter 27 recycles the staircase operation of device 24.

Thus a T = k cos α pattern is generated, in which each line—irrespective of its length—follows immediately the preceding one without any time loss as it would be caused by a rectangular scanning system. That is the time interval between the end of a scanning line and the beginning of the next one irrespective of their length is essentially constant.

It should be noted that the system described is a feedback system, which causes the beam of the cathode ray tube 16 to show the same pattern as the cutout of diaphragm 17. A second cathode ray tube 31 is controlled by the same deflection voltages as cathode ray tube 16 and produces therefor the same beam pattern. The light spot formed by cathode ray tube 31 is projected via an optical system 32 and a beam splitter 33 onto a gray scale cosine diaphragm 34, shown in FIG. 6. The light output of this diaphragm is received via an optical system 35 by a photocell 36, which releases cosine waves to amplifier 37, which latter feeds one set of deflection plates of the projection cathode ray tube or similar device 38. 39 designates the video input to the projection cathode ray system.

Another gray scale diaphragm 44 carrying a sine pattern (as shown in FIG. 7) receives a light beam from the beam splitter 33 and provides sine wave modulated light signals via the optical system 45 to photocell 46, which feeds an amplifier 47, that supplies sine waves to the second set of deflection plates of cathode ray projection system 38. The cathode ray projection system provides the annular picture input to the wide angle optical projection system, which may consist of a lens system 51, that projects the annular picture onto a (for example hyperboloidal) mirror 52, which in turn reflects the picture onto a (for example hyperboloidal) mirror 53, from which the picture is reflected onto the surrounding projection sphere (not shown).

Another cathode ray tube 61 is connected to the horizontal and vertical deflection voltages occurring on lines 15 and 25. The light pattern generated by this cathode ray tube is projected onto a diaphragm 62 (shown in FIG. 8), which in turn is projected via an optical lens system 63 onto a photocell 64, which via an amplifier 65 controls line by line the amplitudes of the cosine and sine waves released from amplifiers 37 and 47 for the generation of the annular optical input picture by the cathode ray system 38. Amplifier 65 contains filtering networks, which cause a constant bias for the gain control of amplifiers 37 and 47, varying only from scanning line to scanning line.

The gray scale diaphragm 34, shown in FIG. 6, has a cosine pattern, that changes from a clear, highly transparent (shown as dash-dotted) line a via medium transparency gray line b to an opaque line c, rising again in transparency to medium transparency gray line b and further to a highly transparent line a. Thus a light spot travelling horizontally at constant speed over the diaphragm is modulated to a cosine intensity with a D.C. bias, which can, if desired easily be removed in the electrical circuit, for example by a capacitor.

Similarly the gray scale diaphragm 44, shown in FIG. 7, starts on the left side with a medium transparency gray line b, increases, moving to the right, to a high transparency at line a, decreases again in transparency to a medium transparency at line b, changes to opaqueness at line c and increases to medium transparency again at line b. Again a D.C. bias generated by the light spot moving from left to right can be eliminated, if desired.

The outline of the cosine and sine areas of the two diaphragms 34 and 44 is chosen such, that it matches the display scanning line lengths pattern generated by diaphragm 17. The cutout of diaphragm 62 (FIG. 8) is designed such, that, when the light pattern generated by cathode ray tube 61 is projected to cover the whole cutout of diaphragm 62, the beam of cathode ray device 38 is placed at the appropriate radius r to achieve equidistant elevation angular display lines on the spherical screen. The pattern of the cutout can also compensate for deviations of the optical system 51, 52, 53 from the ideal $α = c(r − r_0)$ relationship.

FIG. 9 shows a system, which is suited to generate the video signals for the display system shown in FIG. 4. A vidicon or similar type camera tube 71 receives the picture to be displayed via the wide angle optical system consisting of two confocal hyperboloidal mirrors 72 and 73 and the lens system 74.

The vidicon has two pairs of deflection plates, which receive via amplifiers 77 and 78 on lines 75 and 76 cosine and sine voltages originating from the two photocells 36 and 46 (FIG. 4). The gain of these amplifiers is controlled by a system similar to the one used for the gain control of amplifiers 37 and 47 (FIG. 4). The deflection plates of a cathode ray tube 79 are connected to lines 15 and 25 (FIG. 4). The pattern generated on the screen of cathode ray tube 79 is projected via a lens system 80 onto a cutout diaphragm 81 of the type shown in FIG. 8. The light passing thru the cutout is projected by a lens system 82 onto photocell 83, which feeds an amplifier 84, that in turn provides the gain control voltages to amplifiers 77 and 78.

The cutout of diaphragm 81 is again designed such, that the circular scanning lines of the vidicon are placed such, that the video signals released from the vidicon via line 39, which may contain an amplifier (not shown) are generating thru the projection cathode ray system 38 a picture on the spherical screen around the projection system, which is undistorted and consists of elevation angular equidistant display lines. A modification of the system described on hand of FIG. 4, which provides a spiral scanning is shown in FIG. 10. The circuitry shown here replaces the staircase generator 24 and the pulse forming devices 26 and 27 of FIG. 4 by a circuit, which operates similar to the line deflection circuit shown in FIG. 4 but is designed to generate the much slower rising field deflection voltage. It consists of a constant current device 91, which receives a control signal via line 92 to set it at either a high or a low current depending on the intensity on line 21. It charges a capacitor 93, which is discharged by device 94, when the capacitors charge has moved the potential on line 25 to the point where the cathode ray beam of cathode ray tube 16 has moved under the bottom cutout line of diaphragm 17. The long pulse generated hereby on line 21 is fed via filter 96 to the discharge control electrode of discharge device 94. Device 95 again allows a three level, ultrafast, fast and slow charging of capacitor 93. It should be noted that for a three level operation it is advantageous to border the cutout of diaphragm 17 (FIG. 5) with a semitransparent band.

Figure 11:
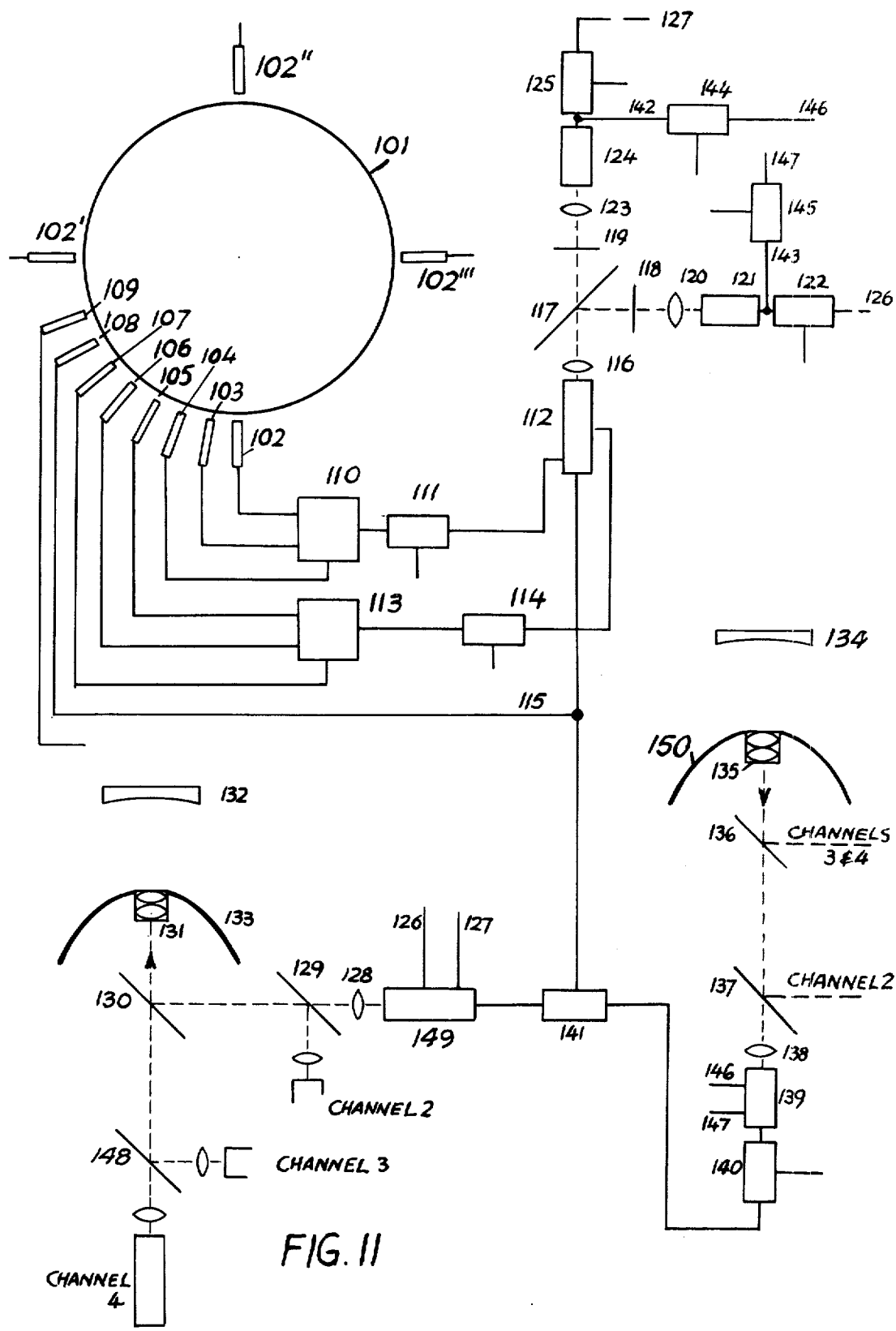
FIG. 11 shows a display system using a rotary signal generation system.

Another embodiment of the display system according to this invention is shown in FIG. 11. Here a rotary recording medium, for example a magnetic drum or magnetic disk 101 carries the line sweep starting pulses picked up by sensor 102, the line sweep terminating pulses picked up by sensor 103, the staircase generator step pulses picked up by sensor 105, the staircase generator recycling pulse picked up by sensor 106, the blanking signal picked up by sensor 108 and any other signals, that may be desired, symbolized by pickup sensor 109, to achieve a stable operation. Tracks of sensors 104 and 107 may contain amplitude control (adjustment) signals for the slope of sweep generator 110 and the steps of staircase generator 113.

The line sweep generator 110 controlled by pulse sensors 102 and 103 is followed by an amplifier 111 which is connected to the horizontal deflection plates of cathode ray tube 112.

The staircase generator 113 controlled by pulse sensors 105 and 106 is followed by an amplifier 114, which is connected to the vertical deflection plates of cathode ray tube 112.

The blanking signal derived by sensor 108 controls via line 115 the control electrode of cathode ray tube 112. Thus a pattern equal to the one generated on the screen of cathode ray tube 31 (FIG. 4) is generated on the screen of cathode ray tube 112. This pattern is then processed via beam splitter 117, the two cosine and sine gray scale diaphragms 118 and 119 and their associated trains of lens system 120 and 123, photocells or photomultipliers 121 and 124 and amplifiers 122 and 125, which produce onlines 126 and 127 the cosine and sine wave signals for the deflection plates of cathode ray projection system 149.

The gray scale diaphragms 118 and 119 in this case are preferably laid out such, that the left border line, that is line a in the cosine and line b in the sine pattern are straight lines with a corresponding bending of all other lines of equi-transparency as shown in FIGS. 12 and 13. The rotary recording medium 101 also carries amplitude control signals also symbolized by pickup 109, which control the output of amplifiers 122 and 125 such that the scanning circles of cathode ray system 149 produce the elevation angular equidistant display line pattern according to this invention.

Shown in FIG. 11 is a four channel system each of which channels consists of a system as described above, whereby the rotary recording medium is common to all channels. However each channel has its own pickup sensors (symbolized by 102', 102" and 102'" and corresponding other track pickup sensors for the other channels), which are evenly distributed around the circumference of the rotary recording medium 101.

The picture generated by cathode ray projection system 149 of channel 1 is projected via lens system 128, beam splitters 129 and 130, lens system 131 and confocal hyperboloid mirrors 132 and 133 onto the surrounding projection screen sphere.

Channel 2 is superimposed via beam splitters 129 and 130, whereas channels 3 and 4 are superimposed via beam splitters 148 and 130.

The amplitudes of the cosine and sine waves for the cathode ray projection systems of channels 2, 3 and 4 are controlled such, that the four channels form an even interlacing display. Also shown in FIG. 11 is a system for the generation of the video signals for the four channels, the system for channel 1 being shown in detail.

The picture to be displayed is picked up by the hyperboloidal mirror 150, which reflects it onto its confocal hyperboloidal mirror 134, which in turn reflects the picture into lens system 135 from where it is projected via beam splitters 136 and 137 and lens system 138 onto a vidicon 139, which is followed by amplifiers 140 and 141, which latter provides the video signal to cathode ray projection system 149.

The deflection sine and cosine signals for vidicon 139, generated by photocells or photomultipliers 124 and 121 are fed via lines 142 and 143 to amplifiers 144 and 145, which supply via lines 146 and 147 the deflection signals for camera tube 139.

Amplifiers 144 and 145 are gain controlled for example by additional track signals of the rotary recording medium 101, which cause the scanning lines to be placed on the appropriate scanning radius on vidicon 139.

The vidicon of channel 2 receives its picture via beam splitters 136 and 137, whereas channel 3 and 4 vidicons receive their pictures via beam splitter 136 and another beam splitter (not shown).

The gain control of amplifier 140 and corresponding amplifiers in channels 2, 3 and 4 serves to match the video signals of the four channels.

Amplifier 141 and corresponding amplifiers in the other channels are controlled by the blanking signals which are given between successive line scans.

Instead of generating the cosine and sine waves by the use of a constant slope (deflection speed) varying amplitude scanning line, which demands a gray scale pattern as shown in FIGS. 6 and 7, the cosine and sine waves can be generated by a constant amplitude but varying slope (deflection speed) scan. This simplifies the gray scale diaphragms 118 and 119, which will have then a rectangular pattern as shown in FIGS. 14 and 15 of very small height and parallel equitransparency lines and eliminates the need for a vertical deflection and thereby the need for a staircase generator 113 and its associated equipment. It also eliminates the need for the vertical deflection system of cathode ray tube 112, which will scan then only in one line.

The appropriate slope variations of sawtooth generator 110 are controlled by signals, which are recorded on the rotary recording medium 101 and picked up by sensor 104.

Another embodiment of this invention uses also the recording medium 101, which carries however instead of the controls for an optical cosine/sine wave generation system as shown in FIGS. 4 and 11, directly the cosine and sine signals needed for the constant azimuthal deflection speed—elevation angular equidistant line pattern according to this invention. These cosine and sine signals are picked up for example by sensors 102 and 103 and their amplitude controls are picked up for example for sensors 104 and 105 for the operation of cathode ray projection system 149 amplifiers 122 and 125. In this case the signals derived from sensor 102 feed directly amplifiers 122 and 145, the signals derived from sensor 103 feed directly amplifiers 125 and 144. The sensor channels 106 and 107 may be used to control the gain of amplifiers 145 and 144. Sensor 108 supplies again the blanking signal for the interval between successive line scans.

Other modifications or forms of the embodiment of this invention can be made. For example, the system shown in FIG. 4 can be modified to operate with a constant amplitude—varying slope scan on cathode ray tube 31 by providing an individual amplifier for the operation of its horizontal deflection plates. The gain of this amplifier would be controlled by a system similar to the one shown for the control of amplifiers 37 and 47 consisting of components 61, 62, 63, 64 and 65. The gray scale diaphragms 34 and 44 would be like those shown in FIGS. 14 and 15.

Or, the cosine and sine waves for the deflection of the cathode ray projection system 149 (FIG. 11) may be computer generated in wave form (frequency) and amplitude.

What is claimed is:

1. In a wide angle television display system the combination of a plane annular input-circularly arranged screen output optical system and means for a constant spherical-angular speed scanning at the display of several constant elevation angular distances spaced display lines forming the display.

2. In a wide angle television display system as defined in claim 1, said plane annular input-circular output optical system being a plane annular input-spherical output optical system.

3. In a wide angle television display system as defined in claim 1, said display lines being scanning lines of a television channel falling between an elevation angle of 45° and the maximum elevation angle and/or falling between a depression angle of 45° and the maximum depression angle.

4. In a wide angle television display system as defined in claim 1, said means for a constant spherical-angular speed scanning at the display of several display lines forming the display having a constant scanning time per steradian in each channel over at least 60% of the display area.

5. In a wide angle television display system as defined in claim 1, in which said display lines form circles.

6. In a wide angle television display system as defined in claim 1, in which said display lines form spirals.

7. In a wide angle television display system as defined in claim 1, means to generate sinusoidal line deflection signals (voltages or currents) of frequencies whose periods are proportionate to the cosine of the angle between the horizon line and the momentary display line.

8. In a wide angle television display system as defined in claim 1, means to generate sinusoidal line deflection signals (voltages or currents) of frequencies whose periods are proportionate to the cosine of the angle between the horizon line and the momentary display line and of amplitudes which change in each channel from line to line such that successive display circles or spirals of each channel are progressing by a constant elevation-angular amount within the constant spherical angular speed scanning display area.

9. In a wide angle television display system as defined in claim 1, means to generate sinusoidal line deflection signals (voltages or currents) of frequencies whose periods are proportionate to the cosine of the angle between the horizon line and the momentary display line and of amplitudes which change in each channel from line to line such that successive display circles or spirals of each channel are progressing by a constant elevation angular amount for all said display lines forming the display.

10. In a wide angle television display system as defined in claim 1, said means for a constant spherical-angular speed scanning comprising a line deflection signal generator of a channel which provides single sine and cosine periods of frequencies which are proportionate to the secant of the angle between the line to be displayed and the horizon line.

11. In a wide angle television display system as defined in claim 1, in which said means for a constant spherical-angular speed scanning provide only a $\beta/2\pi$ part of the cycles of single sine and cosine deflection signals, wherein $\beta$ is the azimuthal range covering angle.

12. In a wide angle television display system as defined in claim 1, said means for a constant spherical-angular speed scanning at the display of several display lines forming the display comprising a line deflection signal generator of a channel which provides parts of single sine and cosine periods of frequencies which are proportionate to the secant of the angle between the line to be displayed and the horizon line.

13. In a wide angle television display system as defined in claim 1, the elevation respectively the depression angle of display points of said plane annular input-circularly arranged screen output optical system being linearly proportionate to the radius of the corresponding source points of the plane annular input.

14. In a wide angle television display system as defined in claim 1, said means for a constant spherical-angular speed scanning at the display of several display lines forming the display comprising a varying line scanning time signal generator.

15. In a wide angle television display system as defined in claim 1, said means for a constant spherical-angular speed scanning at the display of several display lines forming the display comprising a flying spot scanner-diaphragm-photocell varying line scanning time signal generator.

16. In a wide angle television display system as defined in claim 1, said means for a constant spherical-angular speed scanning at the display of several display lines forming the display comprising a rotary line scanning starting and line scanning ending signal generator.

17. In a wide angle television display system as defined in claim 1, said means for a constant spherical-angular speed scanning at the display of several display lines forming the display comprising a varying line scanning time signal generator and a line scanning time to sine and cosine wave converter.

18. In a wide angle television display system as defined in claim 1, said means for a constant spherical-angular speed scanning at the display of several display lines forming the display comprising a varying line scanning time signal generator and a line scanning time to sine and cosine wave converter, said converter comprising a sine and a cosine gray scale diaphragm.

19. In a wide angle television display system as defined in claim 1, said means for a constant spherical-angular speed scanning at the display of several display lines forming the display comprising a rotary line scanning starting and line scanning ending signal generator, said rotary signal generator providing amplitude control signals for the display deflection signal generator.

20. In a wide angle television display system as defined in claim 1, said means for a constant spherical-angular speed scanning at the display of several display lines forming the display comprising a sine and cosine or parts thereof deflection wave signal rotary recording medium generator.

21. In a wide angle television display system as defined in claim 1, said means for a constant spherical-angular speed scanning at the display of several display lines forming the display comprising a rotary recording medium signal generator, said generator having a multiple signal pickup system to provide signals for a multi-channel interlacing display.